Figure 1:
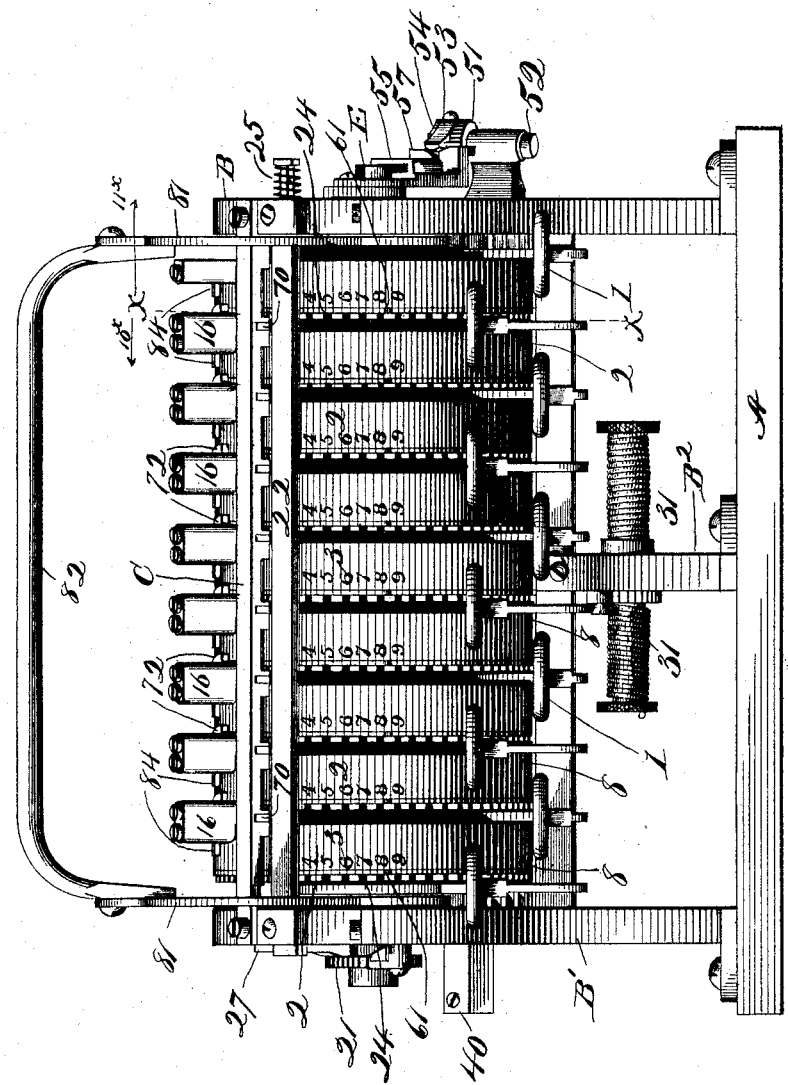

No. 622,157. Patented Mar. 28, 1899.
T. LANSTON.
ADDING MACHINE.
(Application filed May 25, 1894.)
(No Model.) 13 Sheets—Sheet 1.

Witnesses:
W. H. H. Knight
J. M. Fowler Jr

Inventor.
Tolbert Lanston
by Church & Church
his Attorneys.

No. 622,157. Patented Mar. 28, 1899.
T. LANSTON.
ADDING MACHINE.
(Application filed May 25, 1894.)
(No Model.) 13 Sheets—Sheet 2.
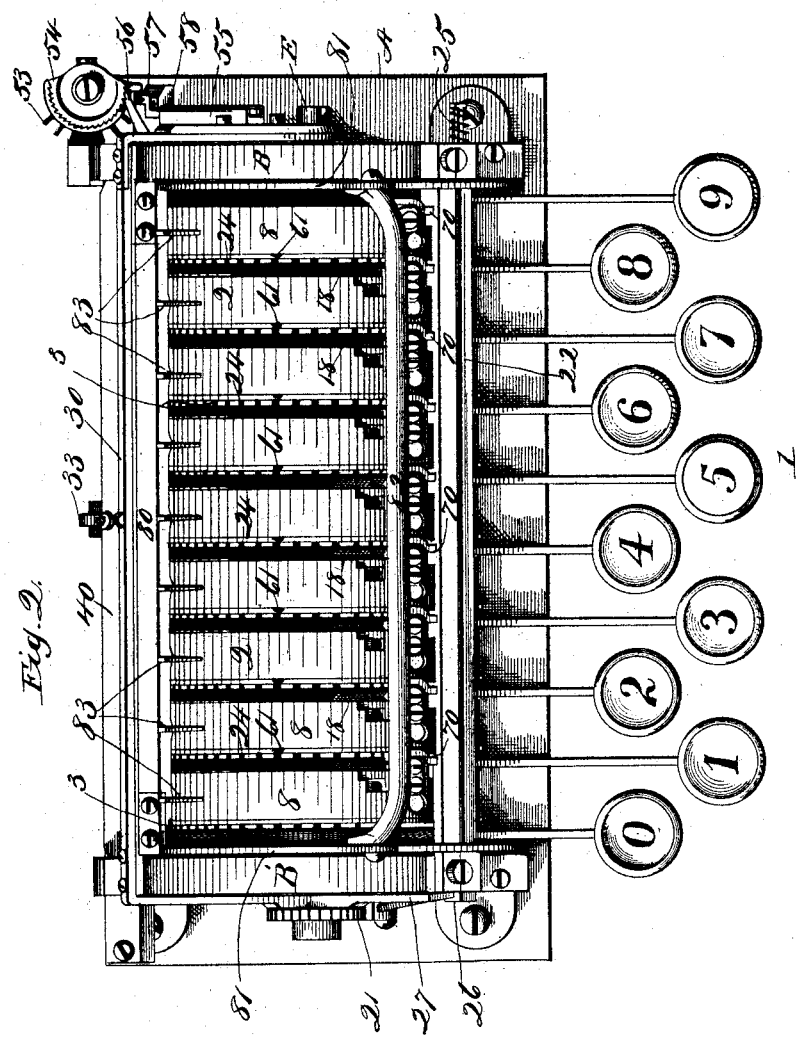
Witnesses:
W. H. H. Knight,
J. M. Fowler Jr.
Inventor.
Tolbert Lanston
by Church & Church
his Attorneys.

No. 622,157. Patented Mar. 28, 1899.
T. LANSTON.
ADDING MACHINE.
(Application filed May 25, 1894.)
(No Model.) 13 Sheets—Sheet 3.
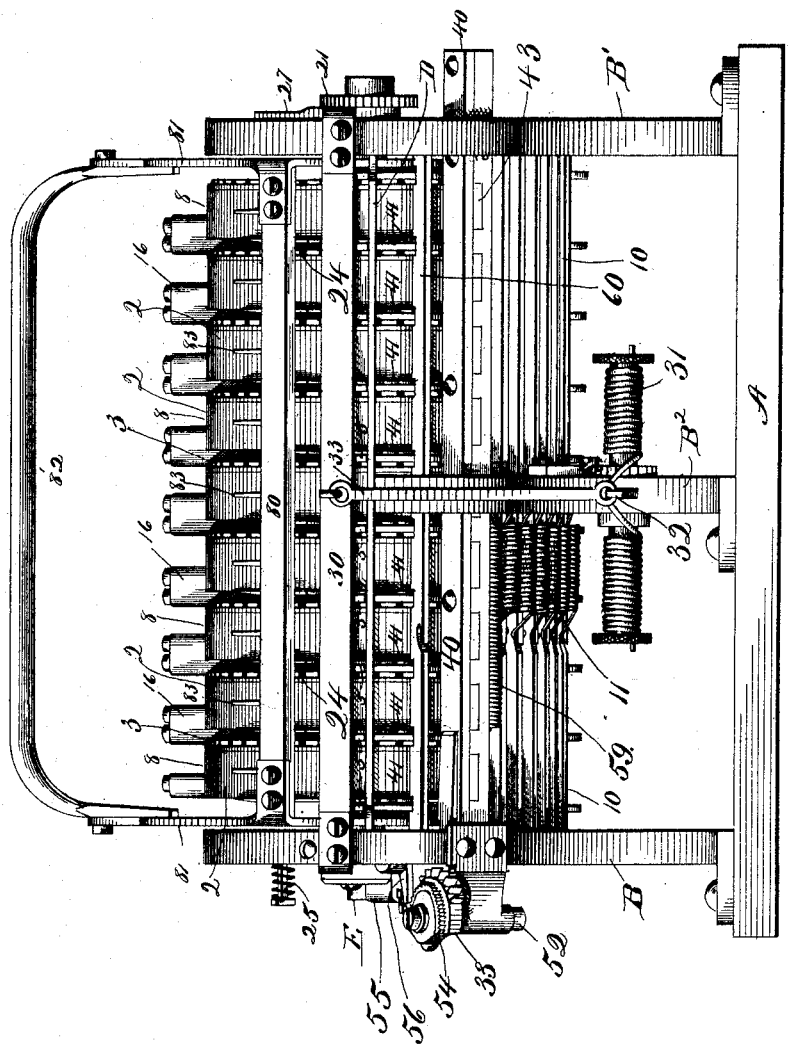
Witnesses:
Inventor.

No. 622,157. Patented Mar. 28, 1899.
T. LANSTON.
ADDING MACHINE.
(Application filed May 25, 1894.)
(No Model.) 13 Sheets—Sheet 4.
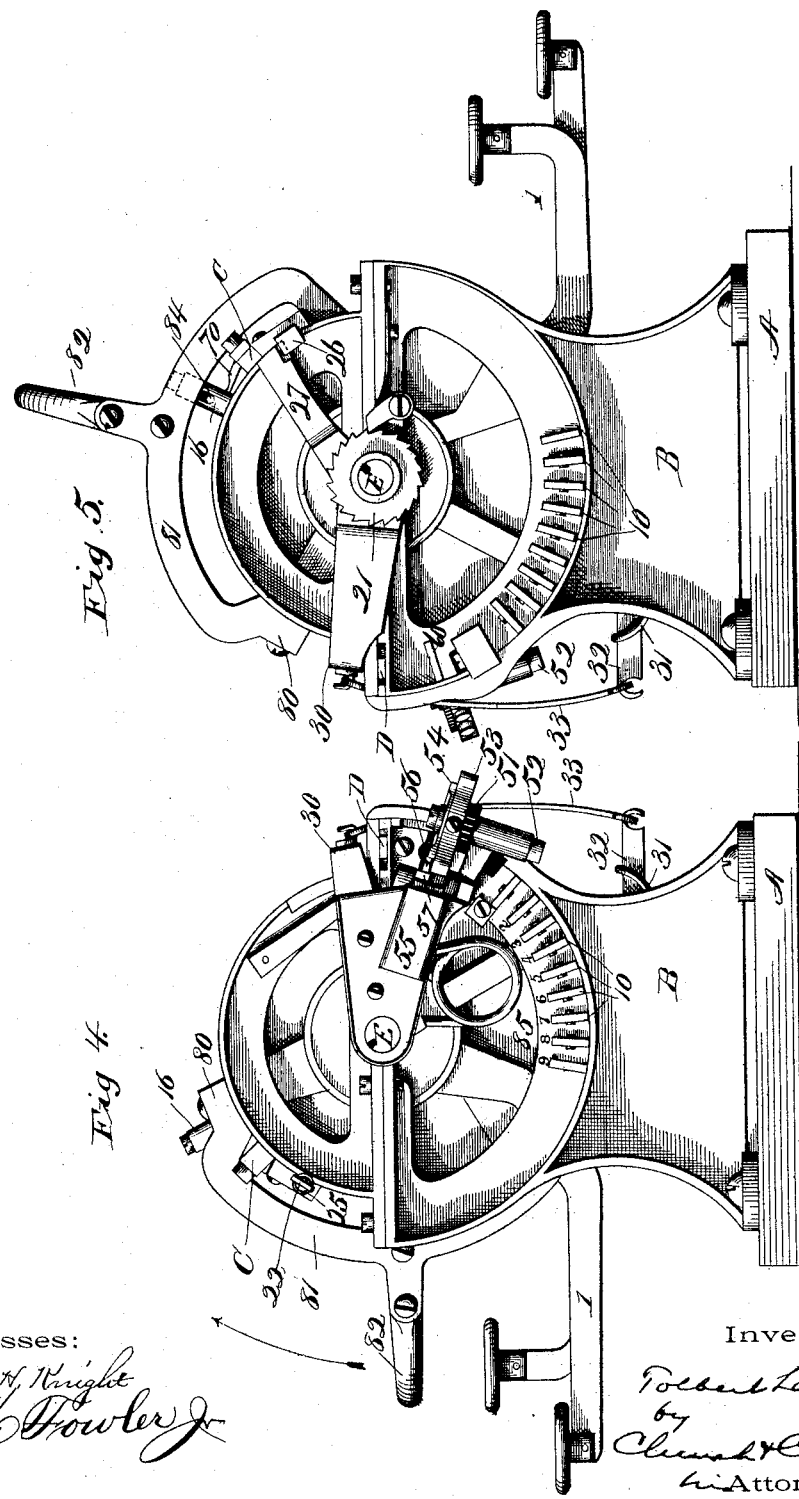

No. 622,157. Patented Mar. 28, 1899.
T. LANSTON.
ADDING MACHINE.
(Application filed May 25, 1894.)
(No Model.) 13 Sheets—Sheet 5.
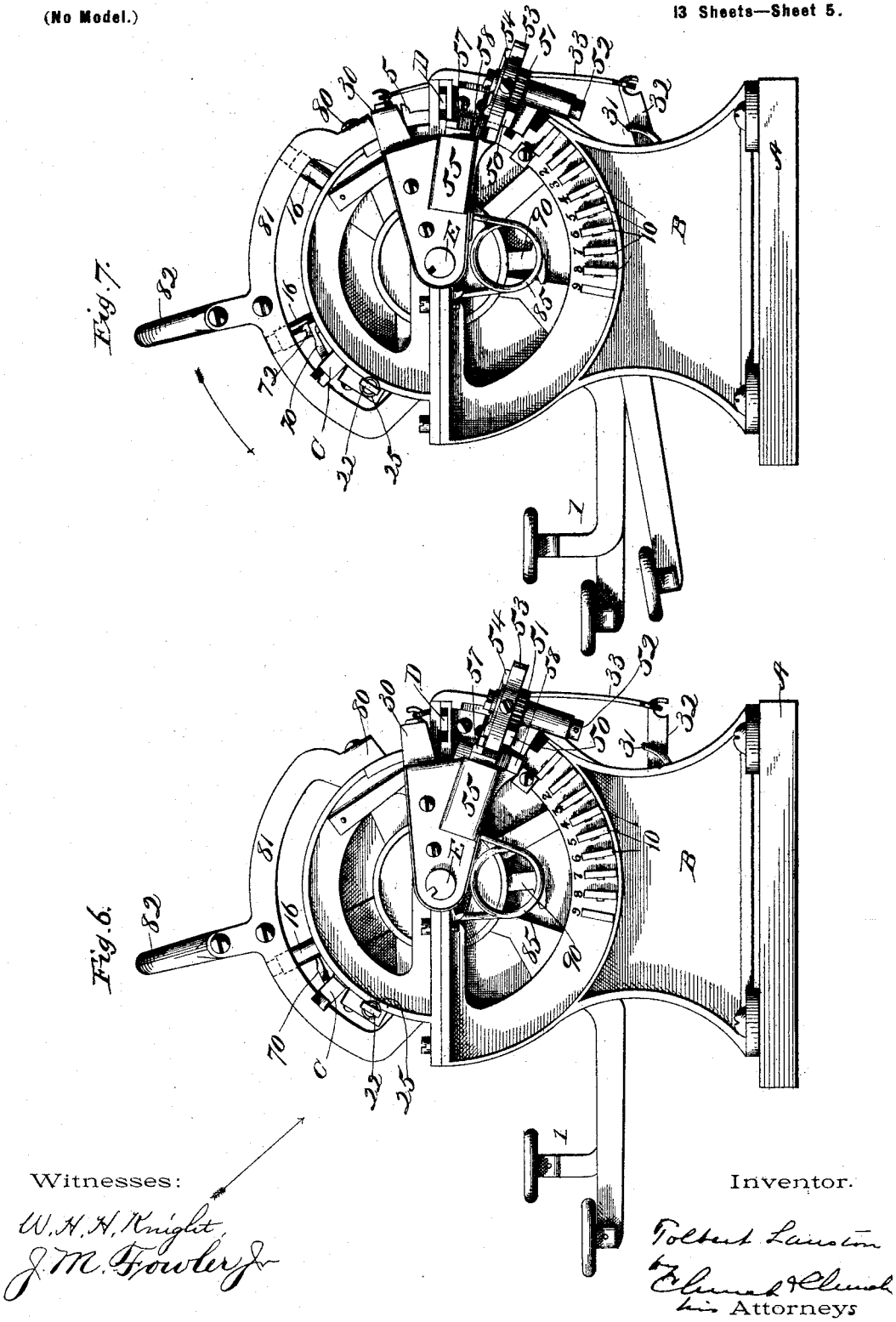
Witnesses:
W. H. H. Knight
J. M. Fowler Jr
Inventor.
Tolbert Lanston
by Edward & Church
his Attorneys No. 622,157. Patented Mar. 28, 1899.
T. LANSTON.
ADDING MACHINE.
(Application filed May 25, 1894.)
(No Model.) 13 Sheets—Sheet 6.
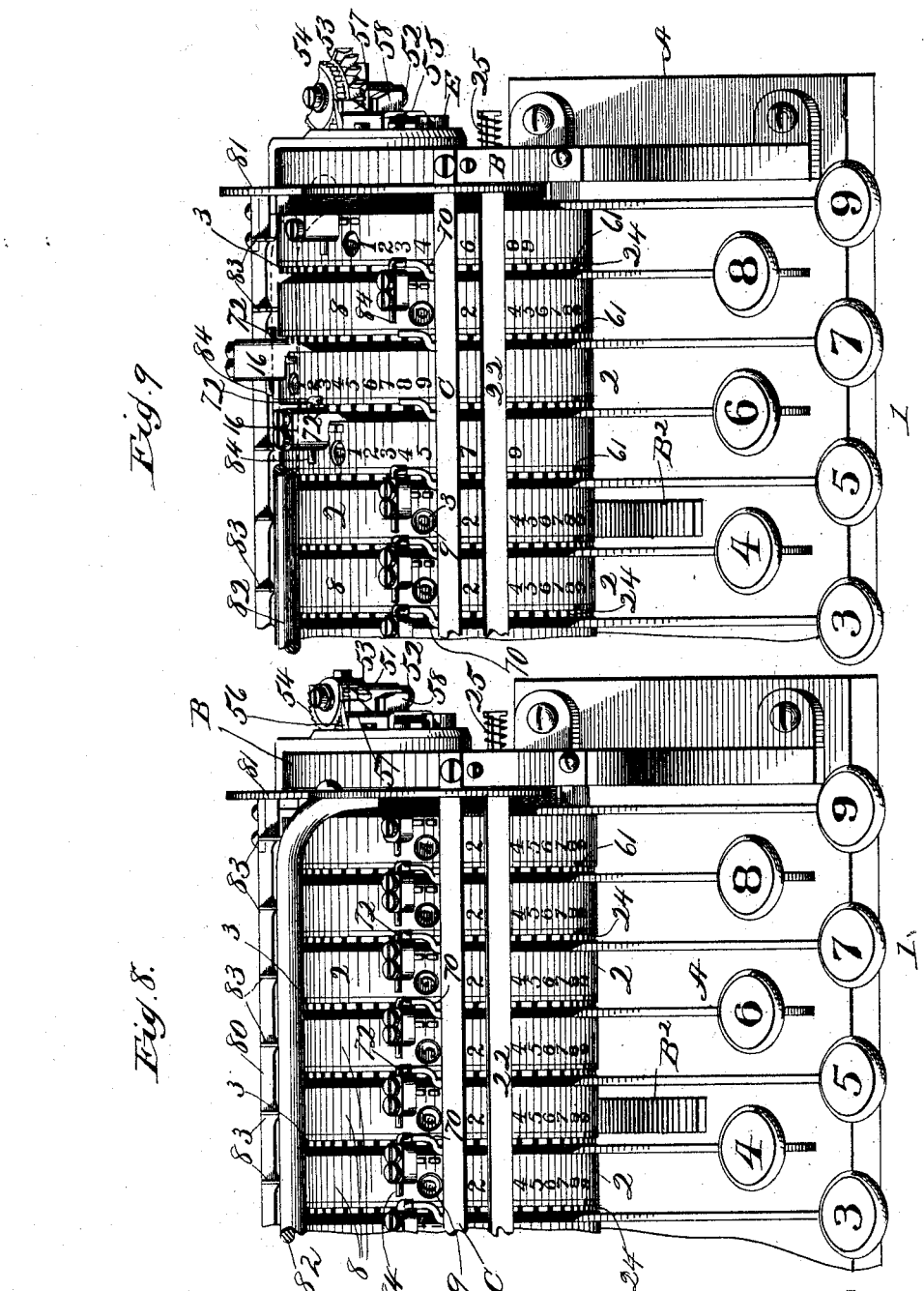
Witnesses:
W. H. H. Knight.
J. M. Fowler Jr.
Inventor.
Tolbert Lanston
by Church & Church
his Attorneys.

No. 622,157. Patented Mar. 28, 1899.
T. LANSTON.
ADDING MACHINE.
(Application filed May 25, 1894.)
(No Model.) 13 Sheets—Sheet 7.
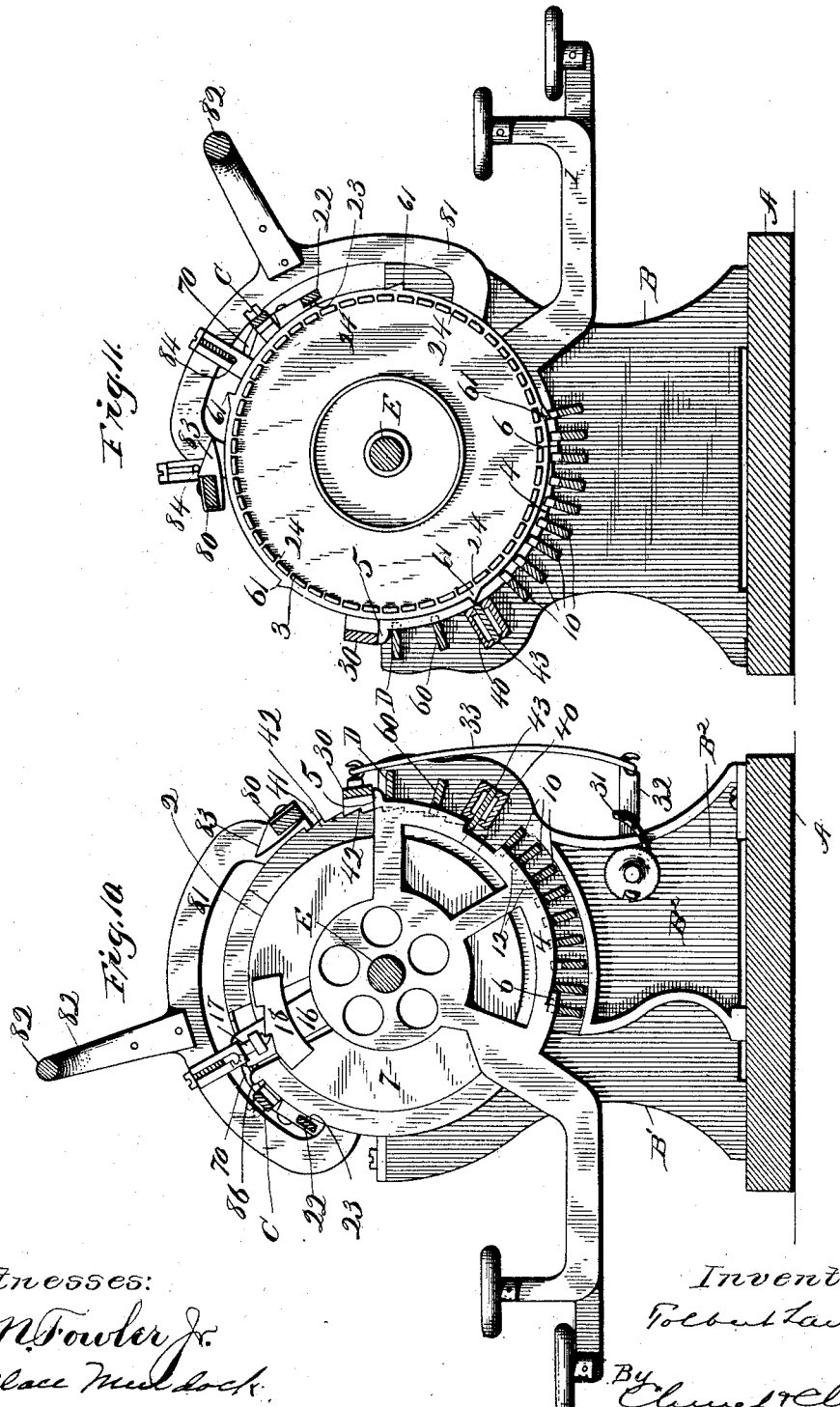

No. 622,157. Patented Mar. 28, 1899.
T. LANSTON.
ADDING MACHINE.
(Application filed May 25, 1894.)
(No Model.) 13 Sheets—Sheet 8.
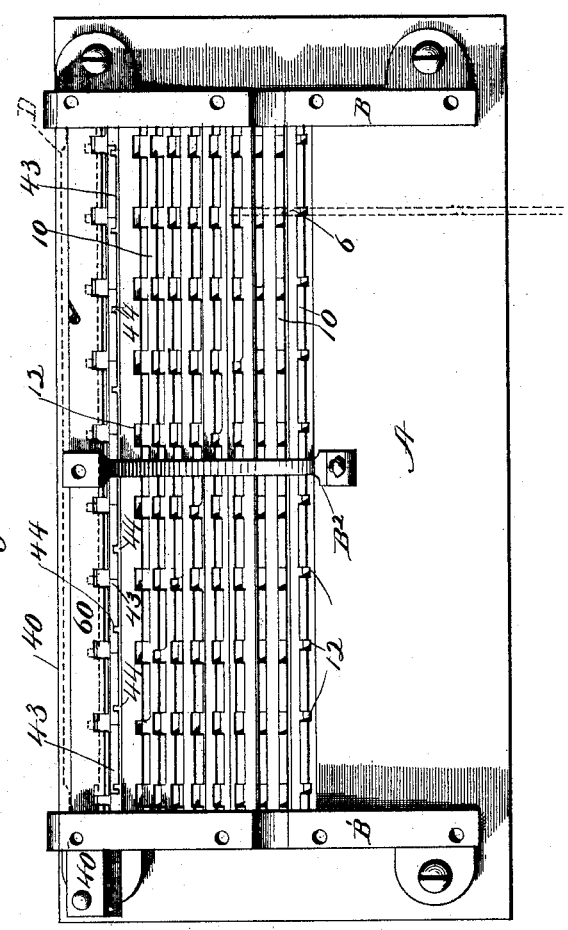
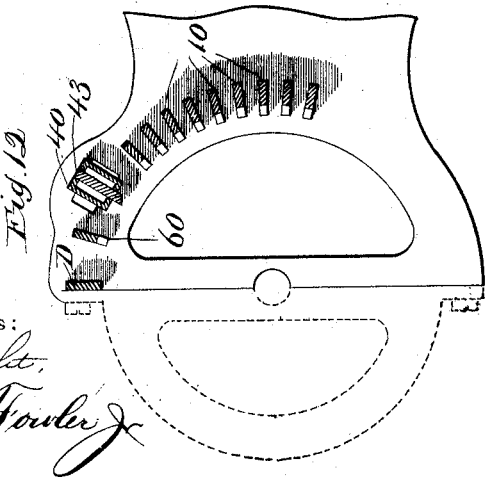
Witnesses: Inventor.

No. 622,157. Patented Mar. 28, 1899.
T. LANSTON.
ADDING MACHINE.
(Application filed May 25, 1894.)
(No Model.) 13 Sheets—Sheet 9.
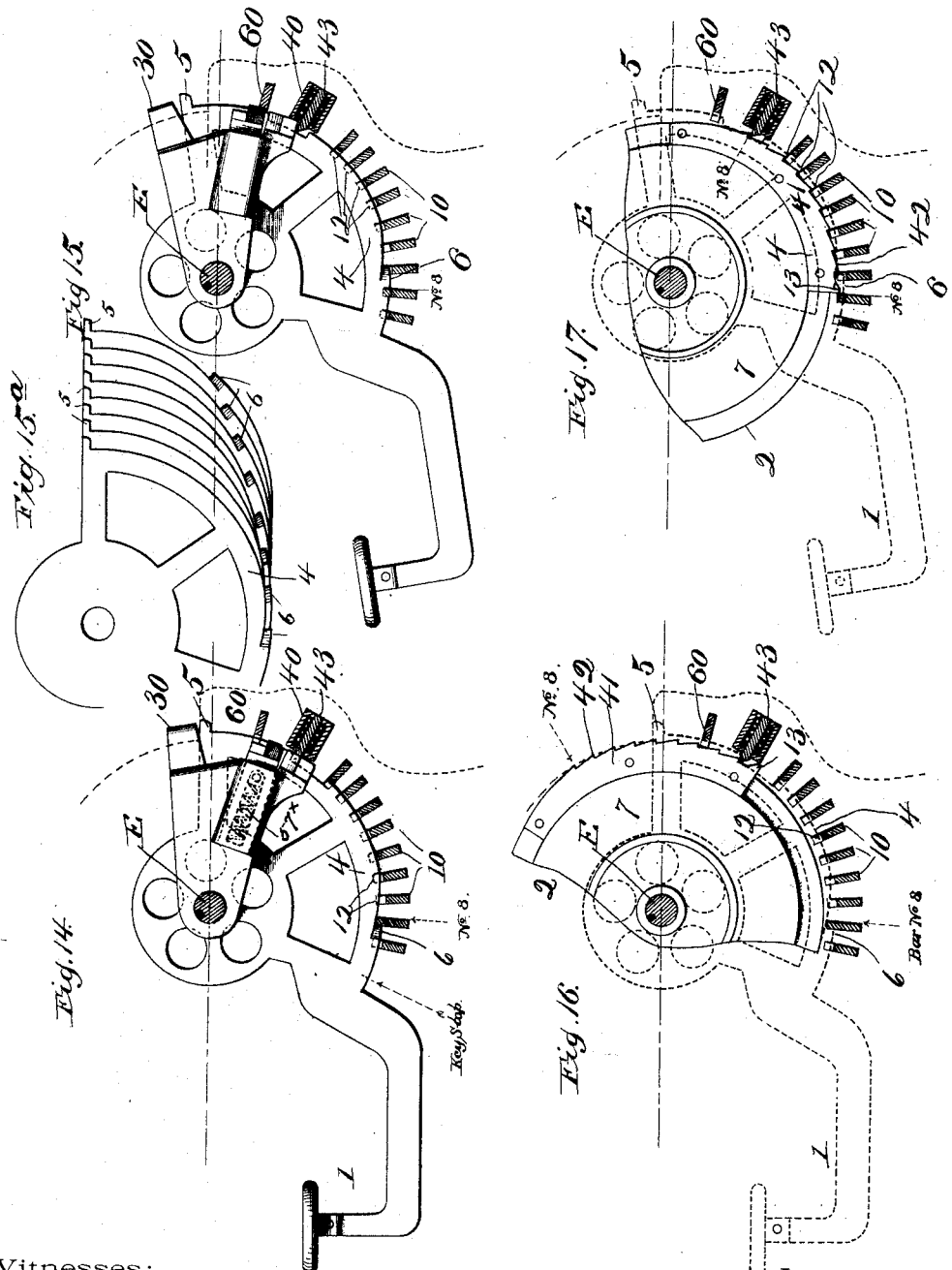

No. 622,157. Patented Mar. 28, 1899.
T. LANSTON.
ADDING MACHINE.
(Application filed May 25, 1894.)
(No Model.) 13 Sheets—Sheet 10.
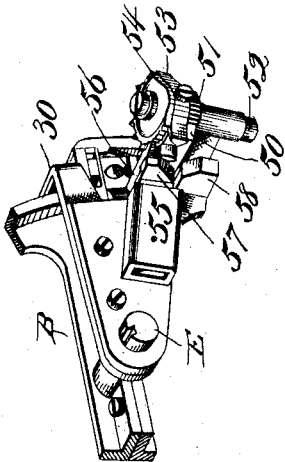
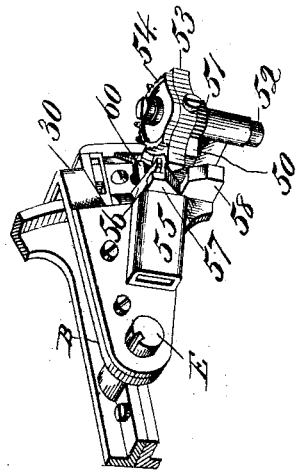
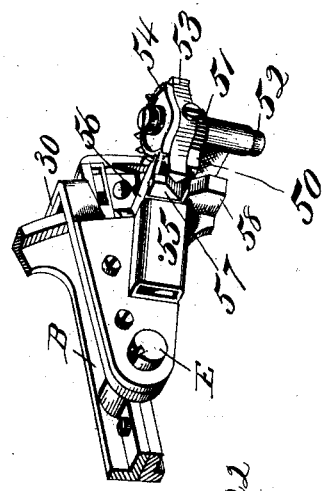
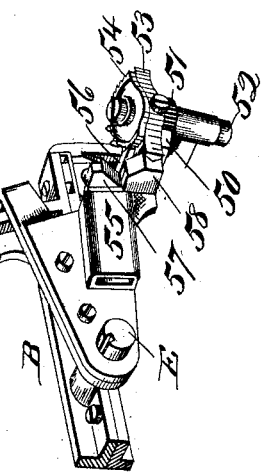
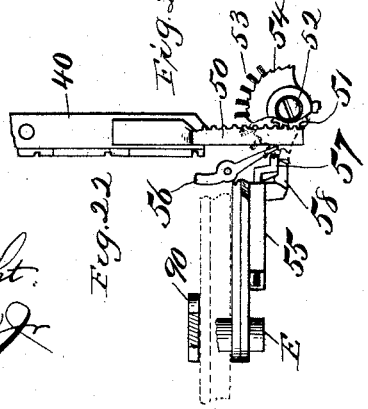
Witnesses:
W. H. H. Knight
J. A. Fowler Jr.
Inventor.
Tolbert Lanston
by Church & Church
his Attorneys.

No. 622,157. Patented Mar. 28, 1899.
T. LANSTON.
ADDING MACHINE.
(Application filed May 25, 1894.)
(No Model.) 13 Sheets—Sheet 11.
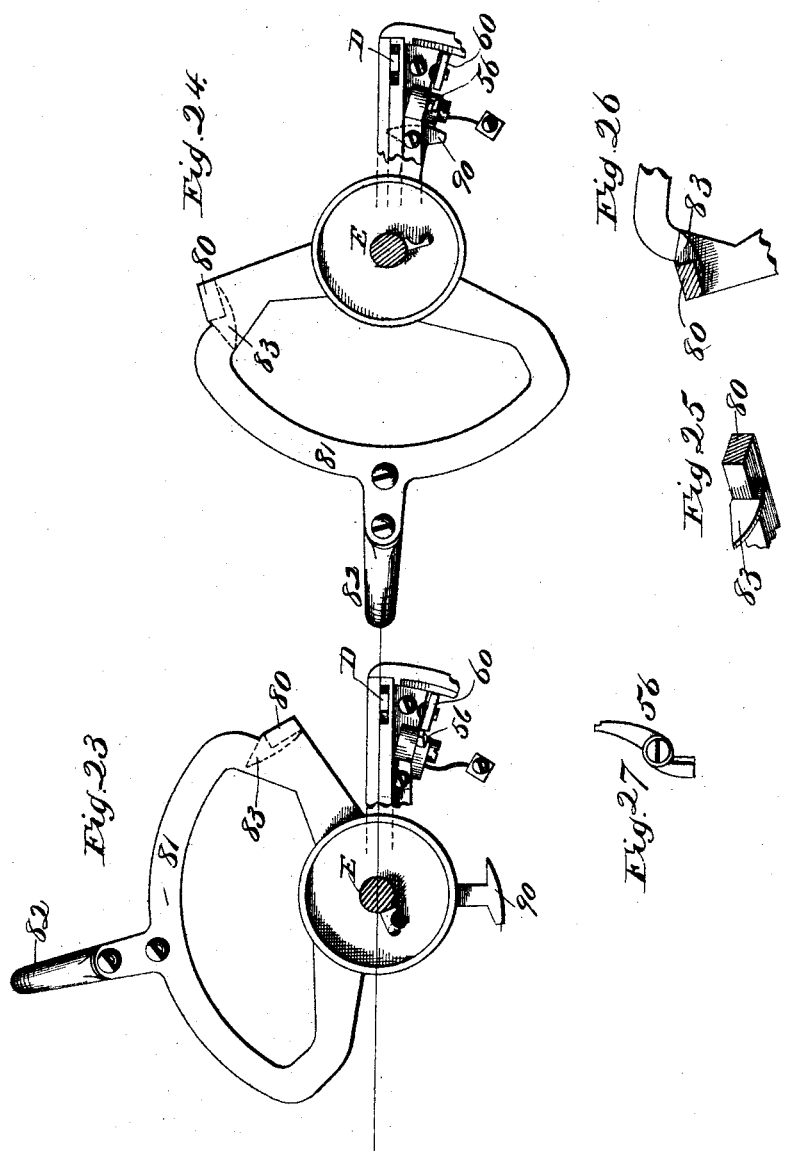
Witnesses:
W. H. H. Knight
J. M. Fowler Jr.
Inventor.
Tolbert Lanston
by Church & Church
his Attorneys No. 622,157. Patented Mar. 28, 1899.
T. LANSTON.
ADDING MACHINE.
(Application filed May 25, 1894.)
(No Model.) 13 Sheets—Sheet 12.
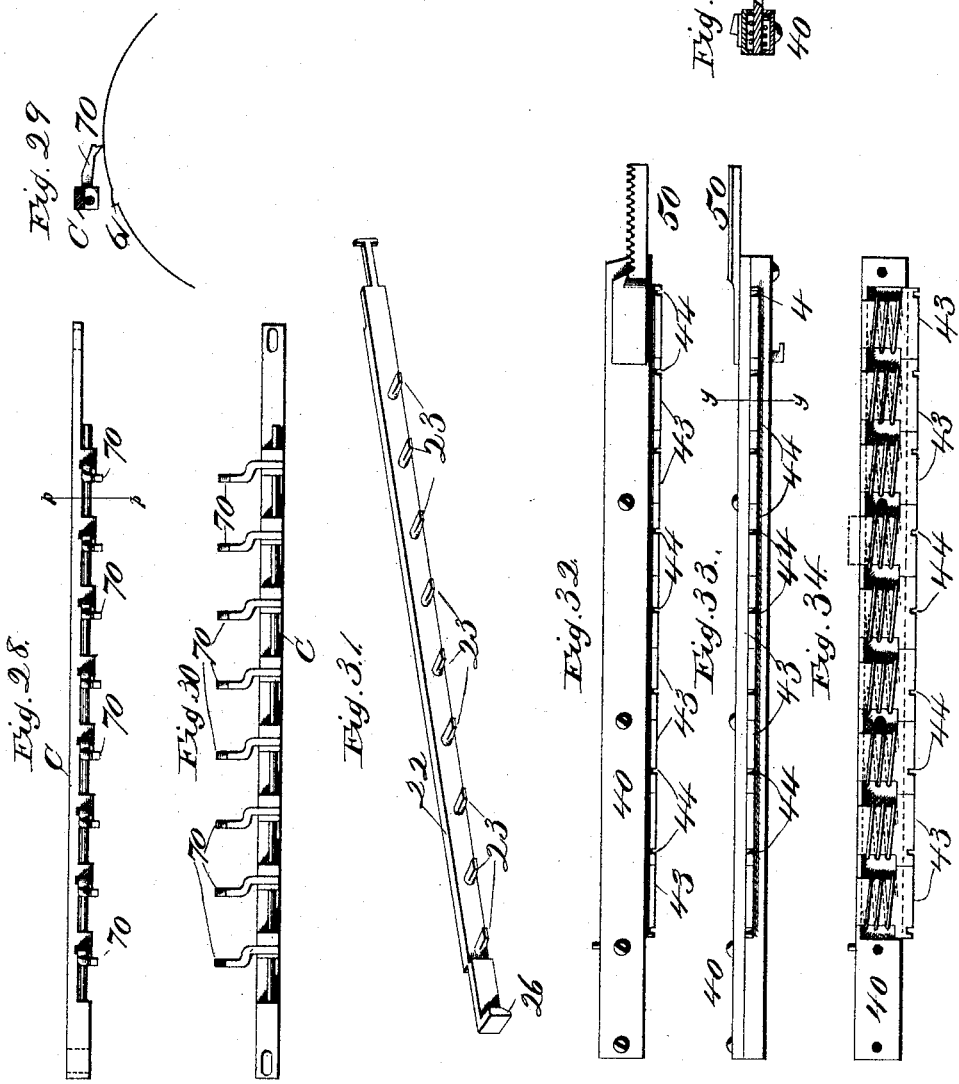

No. 622,157. Patented Mar. 28, 1899.
T. LANSTON.
ADDING MACHINE.
(Application filed May 25, 1894.)
(No Model.) 13 Sheets—Sheet 13.
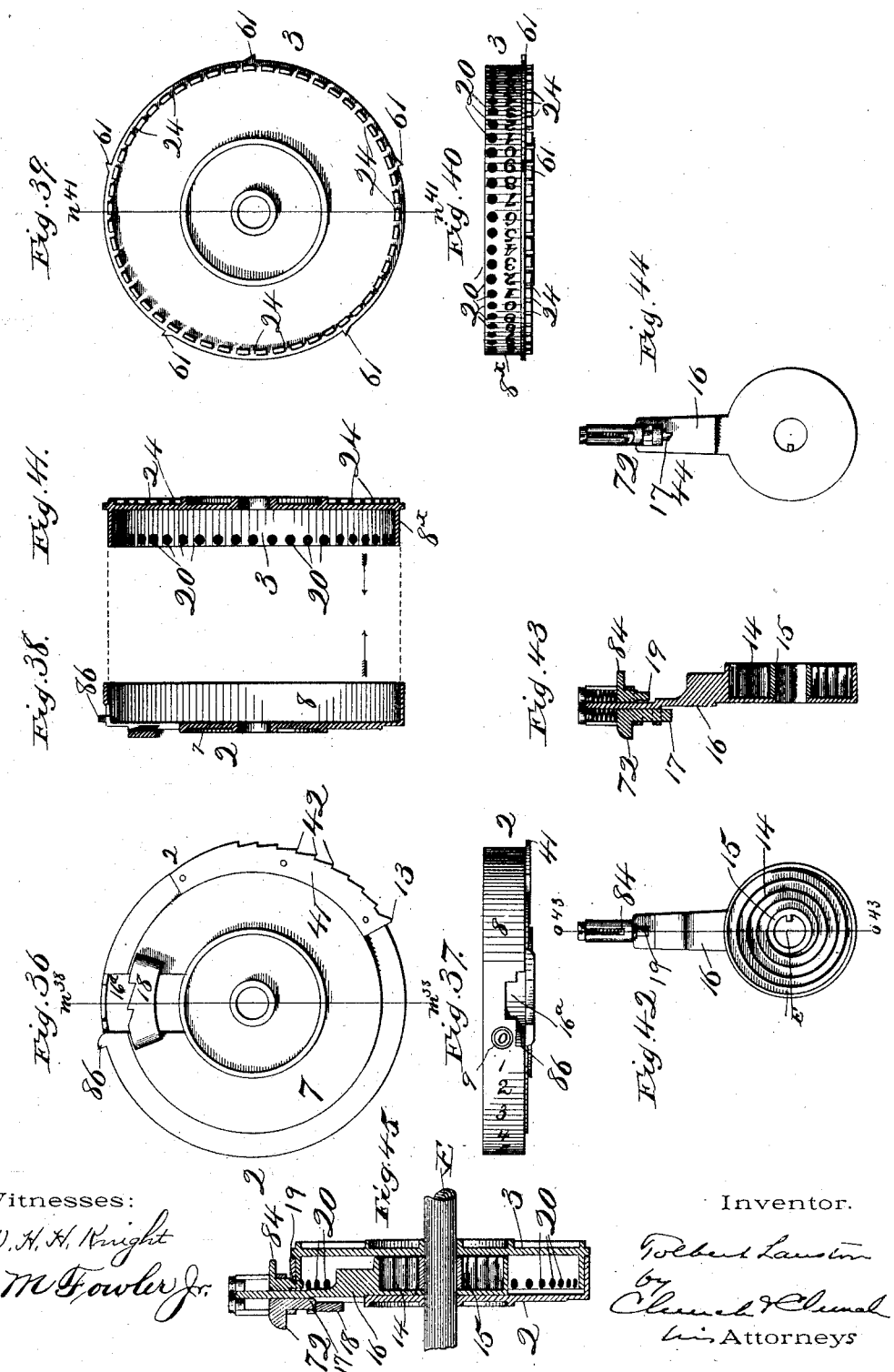
Witnesses: Inventor.

UNITED STATES PATENT OFFICE.

TOLBERT LANSTON, OF WASHINGTON, DISTRICT OF COLUMBIA, ASSIGNOR TO HERMAN HOLLERITH, OF SAME PLACE.

ADDING-MACHINE.

SPECIFICATION forming part of Letters Patent No. 622,157, dated March 28, 1899.

Application filed May 25, 1894. Serial No. 512,472. (No model.)

*To all whom it may concern:*

Be it known that I, TOLBERT LANSTON, of Washington, in the District of Columbia, have invented certain new and useful Improvements in Adding-Machines; and I do hereby declare the following to be a full, clear, and exact description of the same, reference being had to the accompanying drawings, forming a part of this specification, and to the figures and letters of reference marked thereon.

In my invention there are employed a single set or series of keys or equivalent actuating devices for controlling automatically a series of indicators and registers whereby a number represented by a plurality of figures may be indicated and registered or added upon the totalizing devices through the agency of the said single set or series of keys. The effective control of the series of keys over the indicators and registers is automatically transferred to a series of indicators and their corresponding registers progressively, whereby the keys as a series are rendered operative to control or set the indicator or register, or both the indicator and register, of the lowest or units division first, after which their effective power of control is shifted or translated automatically to the indicator or register, or both indicator and register, of the next higher or tens division, and so on progressively until all the figures which go to represent the given number are successively set up and ultimately transferred or added upon the registers.

What is at present regarded as the best embodiment of my invention is a machine containing the following principal elements, it being understood that for some purposes either the means for indicating the number or the means for registering an indicated series of figures or characters may be omitted: first, a series of ten keys, representing different values from "0" to "9," by means of which the numbers are indicated or registered; second, a series of registers upon which the registered amount is indicated; third, a series of indicators upon which the figures of the number to be added or registered are set up or exposed to view; fourth, actuating devices controlled by the keys and governing the position of each indicator; fifth, translating devices operating to automatically shift the control or effective action of the series of keys from one indicator and register to the next progressively, so that the keys of the series will control at any given time but one of the series of indicators and its register and be operative thereon to set or adjust them without interference with the others; sixth, actuating devices controlled by the keys and governing the movements or position of each register; seventh, carrying devices operating between adjacent registers, and, eighth, resetting devices for returning the indicators to normal position and again placing the keys in control of the first of the series of indicators and registers.

As above indicated, either the indicating or the registering devices might be omitted, in which event the single series of keys would be rendered operative through the translating devices to automatically control each indicator or register of the series progressively; but in its most complete and advanced form it is proposed to both indicate the number and to add the indicated number to the amount previously appearing upon the registers. Hence both indicators and registers are employed.

The invention also comprehends minor features relating to novel constructions and combinations of parts by which the new principle is rendered available for useful and practical purposes, all as hereinafter more fully described, and pointed out in the claims.

The term "register" as herein generically used is intended to include what might otherwise be termed a "wheel," a "disk," or other individual device provided with numerals.

In the drawings, Figure 1 is a front elevation of the machine. Fig. 2 is a top plan view. Fig. 3 is a rear elevation. Fig. 4 is a right-hand end view. Fig. 5 is a left-hand end elevation. Figs. 6 and 7 are right-hand end elevations showing different positions of the parts. Figs. 8 and 9 are views in elevation taken from the point indicated by the arrow in Fig. 6 and showing different positions of the parts. Fig. 10 is a vertical transverse section on line $x\ x$ of Fig. 1, looking in the direction of the flight of the arrow $10^\times$ on the same line $x\ x$, Fig. 1, but looking in the direction of the flight of the arrow $11^\times$. Fig.

11 is a similar view from opposite side of register, showing the resetting mechanism in action. Fig. 12 is a sectional view, and Fig. 13 a plan view, of the frame, key-bars, and translating-bar. Figs. 14 and 15 are side elevations of one of the key-levers, showing it in normal and active position. Fig. 15ª is a view illustrating particularly the arrangement of the wedges in different planes on the different keys. Figs. 16 and 17 are detail views showing the key-lever in dotted lines and a portion of the indicator and register controlling mechanisms. Figs. 18 to 21, inclusive, are perspective views of a portion of the translating mechanism shown in different positions. Fig. 22 is a top plan view of the same. Figs. 23 to 26, inclusive, are detail views of portions of the resetting devices. Fig. 27 is a detached view of the pawl forming part of the translating mechanism. Fig. 28 is a rear elevation, Fig. 29 a section, and Fig. 30 a bottom plan, of the tripping-levers and bar forming part of the carrying mechanism. Fig. 31 is a perspective view of the locking-bar. Fig. 32 is a top view, Fig. 33 a front view, Fig. 34 a top view with covering-plate removed, and Fig. 35 a transverse section, of the translating-bar. Fig. 36 is a side elevation, Fig. 37 an edge view, and Fig. 38 a sectional view, of one of the indicators, taken on the line $m^{34}$, Fig. 36. Fig. 39 is a side elevation, Fig. 40 an edge view, and Fig. 41 a sectional view, of one of the registers, taken on the line $n^{41}$, Fig. 39. Fig. 42 is a left-hand elevation, Fig. 43 a longitudinal section taken on the line $o^{43}$, Fig. 42, and Fig. 44 a right-hand view, of one of the impelling-arms, its spring, and pawls. Fig. 45 is a sectional view of the indicator, register, and impelling-arm connected.

The same letters and numerals of reference in the several figures indicate the same parts.

The frame of the machine, which may be of any desired form or construction, is composed in the present instance of a base-plate A and two uprights or heads B B', connected in front by a cross-bar C and in rear by a cross-bar D. A shaft E, mounted in the heads B B', may also be regarded as part of the frame, as it is normally held in fixed position, and, except for an adjustment to be hereinafter explained, it serves merely as a support for some of the active members. An intermediate supporting-standard $B^2$ is also fixed to the base-plate.

The keys, indicators, and registers are mounted to turn upon the shaft E, which arrangement is advantageous as rendering the machine as a whole smaller and more compact.

The keys 1, ten in number, ranging in value from "0" to "9" and conveniently disposed in two ranks, are pivotally mounted upon the shaft E at regulated distances apart, and in the intervals between adjacent keys are mounted an indicator 2 and a register 3. Each key 1 is provided with a segmental portion 4, a shoulder 5, and, with the exception of the "0" key, a wedge or inclined portion 6, lying in the plane of the segment; but the wedges 6 of the several keys are not in the same transverse plane. On the contrary, they stand in relatively different planes and at regulated distances apart, as will hereinafter appear. Thus the wedge 6 of the "7" key is located one space or division in rear of that of the "8" key, the wedge of the "6" key two spaces or divisions in rear of the "8" key, and so on up to the "1" key. The "0" key has its wedge located beyond the wedges of the series of numbered keys, as the wedges of the latter operate through or as part of the indicator and register actuating or controlling devices, whereas that of the "0" key merely locks the indicator and registers against movement and operates only upon the translating devices to shift the key-action past one or more of the indicators and registers, as will be hereinafter explained.

The indicators 2 are each composed of a disk or central portion 7, supporting a cylindrical flange 8, upon the exterior of which are arranged a series of figures running from "1" at the beginning to "9" at the end or extreme limit of the movement of the indicator. The indicators of the series are arranged to represent values as usually written—that is to say, the one at the extreme right represents units, the second to the left tens, the third hundreds, and so on to any desired extent. In the example illustrated there are nine indicators, with a capacity for indicating any number less than a billion.

The registers 3 are somewhat similar in form to the indicators, each being provided with a central supporting-web pivoted upon the shaft and a cylindrical flange $8^{\times}$; but the flange $8^{\times}$ is slightly smaller than the cylindrical flange 8 of the indicator and is arranged to fit within the latter. Upon the periphery of the register and at equal distances apart are arranged one or more, preferably five, series of figures running from "0" to "9," which figures are rendered visible one at a time through a sight-orifice 9, formed in the surrounding rim of the indicator (see Figs. 8, 9, and 37) and so located with respect to the movement of the indicator that when the latter is returned to normal position the figure of the register which is visible through the hole in the indicator will show the amount registered.

The actuating devices, through which the keys are caused to control the movements of the indicators and registers, will now be described, and as preliminary thereto it may be stated that although those mechanisms have many parts in common, yet measured by the ultimate action and effect it may properly be said there are two sets of actuating devices considered as a whole, the one directly affecting the indicators and the other the registers. Supported at their ends in the heads B B' is a series of nine bars 10, symmetrically disposed in the arc of a circle of which the shaft E is the center. The bars are parallel and equidistant apart, and with the exception of the front or "9" bar they are permitted a limited longitudinal motion in the heads B B' and are held retracted by springs 11, one for each bar. In the inner or front edge of each bar 10 is formed a series of ten notches 12, one for each key, to receive and accommodate the segmental portion 4 of each key; but as will be seen upon inspecting Fig. 13 the notches are not all of the same width. The notches 12 of the front or "9" bar are all of the same width and substantially the thickness of the segmental portions of the several keys. The notches in the other bars of this series are all, save one in each bar, slightly more than twice the width of the notches in the "9" bar—that is to say, slightly more than twice the thickness of the key-segments. Each of said eight bars has one narrow notch (see Fig. 13) standing just in advance of the wedge 6 of one of the keys, so that when any one of the keys "1" to "8" is operated or depressed its wedge 6 will enter the narrow slot in the bar immediately in front of the wedge and shift said bar to the right, thereby causing the unslotted portion of the bar thus shifted to stand across and interrupt the left side of all the channels or ways formed by the several series of wider slots. Thus means are provided whereby upon depressing each key of the series numbered "1" to "8" one of the bars 10 will be shifted to the right and the spaces theretofore existing between each key-segment and the left end of the notch in which it stands will be closed or shut off by the bar. The "0" key does not form part of this mechanism. Hence it is not included in the foregoing explanation.

Upon the right side of each indicator is fixed a tooth or projection 13 of such width or thickness that it can readily pass through the space between the key-segment and the left ends of the notches 12 in the bars 10 when the latter are in normal position; but when any one of the bars is shifted to the right, as when one of the keys is depressed, and its wedge or incline 6 enters the narrow notch, thus moving the bar longitudinally, the indicator will be arrested by its tooth 13 coming in contact with the side of the shifted bar. Thus means are provided for arresting each indicator at any of the nine positions represented by the keys numbered "1" to "9" and by the figures upon the periphery of the indicator, and in this connection it may be stated that the "9" bar, which marks the limit of motion of the indicators and is fixed in position, does not require to be supplied with slots other than to accommodate the segments of the keys.

Inasmuch as the keys serve to limit rather than to produce directly the movement of the indicator, some means are required for inducing the motion of the indicator to advance it to the position designated and determined by any one of the bars 10. Such a means consists of a spring 14, (see Figs. 42, 43, and 45,) one for each indicator, attached at one end to the shaft E, as through a collar 15 splined upon the shaft, the other end of the spring being connected to the indicator in the present instance, and for another additional purpose through an actuator or arm 16, free to swing upon the shaft E between the indicator and register, its upper or outer end projecting through a slot in the rim of the indicator (see Fig. 45) and carrying two spring-pressed pawls, the one, 17, engaging a notched segment 18 on the side of the indicator and the other, 19, engaging holes 20 in the register. The shaft E is provided at one end with a ratchet mechanism 21 for holding it in adjusted position when turned to wind up or place more or less tension upon the several impelling-springs 14. These springs 14 operate to force the several indicators around in a direction to cause their teeth 13 to approach the bars 10, and the several indicators are held retracted or in normal position against the stress of their springs by a locking device, which is released or withdrawn when any one of the keys is depressed. A lock of this kind is shown applied to the registers, (which latter are normally connected to the indicators through the pawls 17 and 19, carried by arm 16,) comprising a bar 22, Fig. 31, supported to move longitudinally in the heads B B' and provided with a series of pins 23, each of which is adapted to enter one of a series of notches 24, formed on the side of each register 3, Figs. 39 to 41. This bar 22 is held by a spring 25, with its pins normally occupying the notches in the registers, whereby the latter, as well as the indicators, are prevented from moving, and it is only when the bar is retracted to withdraw the pins that the indicators or registers are free to advance under the action of the springs until arrested by one of the bars 10. At one end of the bar 22 is located an incline or shoulder 26, against which an arm 27, pivoted upon the shaft E, is arranged to act when any key is depressed, said arm operating to force the bar 22 back toward the left-hand side of the machine until its pins are withdrawn from the notches, thereby releasing the registers and indicators. Motion is communicated to the arm 27 from any one of the keys 1 through a yoke 30, to one end of which said arm is attached, said yoke extending transversely across the rear of the machine and resting upon the shoulders 5 of all the keys. This yoke 30 serves not only to actuate the locking-bar 22, but it also operates to return the keys, for which purpose it is provided with a retracting-spring 31, adjustably attached to the supporting-standard B² and bearing upon a lever 32, whose outer end is connected to the central portion of the yoke through a link 33. The under side of the shoulders 5 on the keys rest normally upon the rear cross-bar D. (See Figs. 10 and 11.)

From the foregoing description it will be apparent how when any one of the keys is depressed the bar 10 corresponding to the key will be interposed at the proper point in the movement of the indicator, the latter will be released, and the spring 14 will move the indicator until its stop makes contact with the designated bar, and that when the indicator is arrested it will exhibit at the indicating-point, in the first instance just above the cross-bar C, the number corresponding to the value of the key operated. It will also be observed that each indicator in the series will be similarly affected whenever any one key is depressed, and, further, that the registers will partake of the same movements as their respective indicators.

We now come to consider the translating devices, through the medium of which the series of keys is caused to operate progressively and automatically upon each indicator and its register, so that any series of figures representing the number to be indicated or added can be successively set up and a proper register effected. In other words, the proposition presented is to provide such an arrangement of parts that with a single series of keys the units of the designated number shall first be indicated, then the tens, and so on to any extent, to accomplish which a translating device or devices are employed, through the medium of which the effective control or action of the series of keys is transferred progressively from the first or units indicator and register to the second or tens indicator and register, and so on throughout the entire series, all automatically. The preferred form of mechanism as applied to this particular variety of registering and indicating device consists of a translating-bar 40, Figs. 32 to 35, arranged to engage the several indicators and hold them in either their adjusted or their normal position, but so arranged and applied that it will automatically and progressively release each of the series of indicators and its register and subject it alone to the action of the keys, and when it is desired to pass any one or more of the indicators or registers, as when a "0" is reached, the "0" key may be utilized for skipping any one or more indicators in the series. Each indicator is furnished with a toothed segment 41, Figs. 16, 17, 36, and 37, whose teeth 42, nine in number, are equidistant apart and are located in rear of the arresting projection or tooth 13. The translating-bar 40 is mounted to move longitudinally in the heads B B', and it is located in rear of and above the rearmost or first in the order of engagement of the bars 10—that is, the bar controlled by the "1" key. Upon the bar 40 is mounted a series of spring-pressed dogs or pawls 43, one for each indicator, the inner or projecting edge of each dog being furnished with a single notch or passage 44, the several notches being located at distances apart equal to the space between adjacent segments 41 plus the thickness of one segment. The bar 40 is so adjusted relatively to the segments 41 of the indicators that when in the normal or starting position all of the segments will be locked or restrained from movement by the engagement of the first tooth of each segment with its dog 43. (See Fig. 16.) The notch 44 in the dog opposite the segment of the units-indicator is located one degree of motion from the segment of that indicator, the notch of the dog opposite the tens-segment is two degrees from the segment, the notch of the hundreds three degrees, and so on through the series, the distances increasing progressively one degree for each indicator. It results from this arrangement that when the translating-bar is moved or advanced longitudinally through one degree of its intermitting motion it will cause the notch 44 of the units-dog to stand in line with and permit the passage of the segment of the units-indicator. Hence the latter is subjected to the control of the series of keys and may be advanced to any position determined by the particular key operated, all the remaining indicators being for the time locked against forward movement. The next forward movement of the translating-bar through one degree will bring the notch of the tens-dog in line with the segment of the tens-indicator, when the latter may be set through the agency of the keys, and the next succeeding movement of the translating-bar in the same direction will release the hundreds-indicator, and so on through the series. The abandonment of any one indicator and register to the immediate action and control of the keys is followed at once by a locking of the indicator in its adjusted position, for the next progression of the translating-bar 40 to release the next higher indicator withdraws the notch 44 from the plane of the segment 41 and interposes the dog 43 in front of one of the teeth on the segment, and this position is retained during all succeeding movements of the translating-bar. All that is required, therefore, to cause the several indicators and registers to be successively subjected to the control of the series of keys is a mechanism for progressively and intermittingly advancing the translating-bar 40 each time one of the keys is depressed, and such a mechanism has been provided and is shown in detail in Figs. 14, 15, 18 to 24, and 27.

To one end of the translating-bar 40 is secured a rack 50, whose teeth engage a pinion 51, secured to a shaft 52, supported in a bearing attached to head B of the frame. The shaft 52 carries a toothed segment 53 and a ratchet-wheel 54, the former engaged by the arms of a vibrating pallet 55, by means of which an intermitting progressive movement is transmitted to the shaft, while the ratchet-wheel is engaged by a pawl 56, serving to prevent back motion of the shaft. The pallet 55 is mounted upon the right-hand end of the yoke 30, and it is provided with two beveled teeth or cam projections 57 58, the beveled surfaces being formed upon intersecting planes in a manner well understood, so that with the yoke 30 depressed or in normal position, as indicated in Fig. 18, the upper tooth 57 will stand behind the first tooth of segment 53, and when the yoke is elevated the point of the lower tooth 58 will enter behind said first segment-tooth, and by virtue of the incline the toothed segment will be advanced a sufficient distance to bring the notch in the units-dog in line with the segment of the units-indicator. As the yoke 30 descends after the indicator has completed its movement the upper tooth 57 engages the second tooth on segment 53, slightly advancing the latter just sufficient to move the translating-bar partially and lock all the indicator-segments, but not enough to release the segment of the second or tens indicator, as that office is performed only when the yoke 30 is again elevated by the depression of one of the keys and the lower tooth 58 is caused to complete the movement of the translating-bar. A spring 59, (see Fig. 3,) engaging the translating-bar 40, serves to retract the latter and hold the toothed segment 53 against the pallet, while the pawl 56, engaging the ratchet-wheel 54, prevents any retrograde movement of the translating-bar.

The degrees of motion of the translating-bar 40 which have been mentioned as occurring between the release of successive indicators is the motion which takes place between successive elevations of the yoke 30—that is, between the successive actions of the lower tooth 58—which is an aggregate of the advance movements produced by both teeth 57 58 of the pallet. The movement effected by the upper tooth or incline 57 during the descent of the yoke serves to lock all the indicator-segments, and it requires the additional movement produced by the lower tooth to bring one of the notches in line with one of the indicator's segments. Hence it is only when a key is depressed sufficiently to raise the yoke 30 and shift its bar 10 that the proper indicator is permitted to pass the translating-bar.

From the foregoing description it will be seen that when one of the keys is depressed to determine the movement of the units-indicator the latter will be released and permitted to advance until it strikes the limiting-bar 10 as soon as the yoke 30 has been raised sufficiently to actuate the locking-bar 22 and bring the tooth 58 into engagement with the first tooth of the segment 53, so as to advance the translating-bar 40 until the notch in the dog 43 opposite the units-indicator has been brought opposite or in line with the segment 41 of said indicator. Thus the units are indicated and registered, and when the key is released and the yoke 30 is again depressed by the spring the locking-bar 22 reëngages the register and the dog on the translating-bar 40 is interposed in front of the segment of the units-indicator, after which the stop-bar 10 is withdrawn, leaving the units-indicator in adjusted position. If now a key representing the value to be indicated on the tens-indicator is depressed, the same operations will be performed, so far as limiting and determining the position of the indicator is concerned; but the movement of the translating-bar 40, produced by the elevation of the yoke 30 a second time, will bring the notch in the dog opposite the segment of the tens-indicator, and the movement produced will be confined to the tens-indicator. Thus each time one of the keys is depressed one of the indicators and registers will be advanced according to the value of the key depressed and the translating mechanism will be set so that when the next key is depressed the indication and registration will be made in the next succeeding column.

The "0" key has no direct connection with the indicators and registers nor their actuating mechanism, its function being solely to actuate the translating devices, so that without changing or shifting the position of any given indicator or register the control of the keys may be shifted past that one to the next.

Above the translating-bar 40 is arranged a bar 60, Figs. 12 to 17, inclusive, slotted like stop-bars 10 for the reception of the several keys and having its narrow slot in line with the wedge or inclined portion 6 of the "0" key. The shoulder 5 of this key engages the yoke 30, as do the shoulders of the other keys. If now the "0" key is depressed, its wedge 6 will shift the bar 60 until the end walls of the several slots or notches 12 in said bar, in which the indicator-segments play, pass under a tooth of each indicator-segment 41, thus locking all the indicators and holding them in position, while the elevation of the yoke 30 operates the pallet 55 and advances the translating-bar 40 one degree, so that at the next action of any one of the keys the next higher indicator will be in position to operate or may be passed, as described.

The next feature of importance in the machine is the carrying mechanism, whereby a register of lower value is caused to operate the next of higher value. The carrying mechanism is not applied to the units-register. Hence the following description applies only to the other registers. Each register 3 is furnished on its periphery with a series of figures from "0" to "9" and a corresponding series of holes 20 for the reception of the pawls 19. The periphery of the register is divided into equal spaces, multiples of ten, and in the present instance there are five series of figures. In proper relation to each series of figures—in the present instance nearly opposite the figure "9"—is located a tooth 61 on the side of the register and projecting beyond its periphery. Upon the front cross-bar C are arranged a series of pivoted dogs or levers 70, Figs. 1, 2, 5, 10, 11, and 28 to 30, whose outer or rear ends rest upon the periphery of the registers and in the plane of the movement of the tooth 61. When the several indicators are in normal or starting position, the shoulder 72 on each one of the pawls 17 stands above one of the dogs 70, as seen in Fig. 7. Whenever any one of the registers is advanced until the tooth 61 passes beneath and elevates the dog 70 in line with it, it will raise the pawl 17 of the next higher register. This will cause the disengagement of the spring-actuated arm 16 from its indicator (which latter is locked in position by the translating-bar 40) and will permit the said arm 16 to advance until the end of the slot 16ª in the indicator is reached, and during this movement the register, which is locked to the arm through pawl 19, will be correspondingly advanced through one space or number. This action takes place when the lower register moves from "9" to "0," thus advancing the next higher register one point. Thus when the units-register is advanced from, say, "8" to "0," as by the addition of two, the tooth 61 of that register will raise the dog 70 of the tens-register and permit the tens-register to advance one point, or from "0" to "1." The advance of the higher register one point by the release of the arm 16 does not interfere with the movement of the register and indicator when acted upon by the keys, for the actuating devices act directly upon the indicators, and the position of the latter is not changed during the carrying operation. Of course during the carrying operation the registers are released by the withdrawal of the locking-bar 22, that action taking place when any key is depressed and is incident to the production of any advance movement involving the carrying operation.

The last of the series of mechanisms which go to make up the complete adding-machine is the resetting mechanism, through the agency of which the indicators and translating devices are brought back to the normal or starting position. It will be remembered that each indicator 2 and its corresponding register 3 are connected and moved forward in unison through the medium of the spring-pressed arm 16 and its pawls 17 and 19, that the register 3 advances continuously in the same direction, while the indicator is given a limited oscillatory or reciprocating movement for the purpose of disclosing at the reading-point the value represented by the particular key which arrests the forward motion of the indicator, and that the locking-bar 22 engages and holds all the registers from movement in either direction until withdrawn by the depression of one of the keys. It follows, therefore, that when the indicators are to be reset or returned to zero-point they must move independently of the registers in order that the latter may be retained in the advanced position to which they were carried when the indicator was last set or advanced. In rear of the arms 16 is located a cross-bar 80, whose opposite ends are secured to two levers or segments 81, one at each end of the machine, pivoted upon the shaft E and connected by a bail or handle 82, through which latter the said cross-bar is moved toward the front of the machine above the indicators and registers and in rear of the arms 16. The segments 81 are slotted, as seen in Figs. 4, 5, 6, 10, and 11, for the passage of the locking-bar 22 and cross-piece C. Projecting forward from the bar 80 is a series of blades 83, one for each arm 16, whose upper surfaces are inclined from the point outwardly to the bar. Each blade 83 stands in line with a pin 84 on the pawl 19, which engages the register, and its point is adapted to enter beneath said pin and raise the pawl out of engagement with the register. A spring 85, having one end secured to the head B and the other to one of the segments 81, serves to hold the cross-bar 80 normally retracted in rear of and beyond the range of movement of the arms 16. When it is desired to return the indicators, the bar 80 is caused to advance, and the blades 83, entering beneath the pins or shoulders 84 of the pawls 19, raise the latter from engagement with the registers, after which the bar makes contact with the arms 16 and carries the latter and the indicators back toward the front cross-bar C until arrested by the tooth 86 contacting with said bar. During this movement the registers are held by the locking-bar 22, while the teeth 42 on the indicator-segments 41, being inclined on their rear edges, force back the spring-pressed pawls or dogs 43 of the translating-bar 40, and thus the indicators are permitted to pass said translating-bar during the resetting operation. The bar 80 will pick up the levers 16 at the various positions to which they have been carried when setting up or registering any series of figures, and in case any one or more of the arms 16 have been advanced to the second notch of segment 18, as in carrying, such levers will be restored to the first notch or tooth, the pawl 17 riding up the incline. This restoration of the pawl 17 to the first or forward notch in the segment 18 is insured, because the pressure in resetting is applied directly to the arm 16 and through it transmitted to the indicator. Hence if the resistance to be overcome in moving the indicator in passing the dogs of the translating-bar exceeds the holding power of the pawl 17 on the inclined face of the first tooth of segment 18 the pawl will yield and the arm 16 be moved back before the indicator is started, and should this action not take place and the indicator be started at once the continued movement of the bar 80 after the indicator engages cross-bar C will result in carrying the arm back until the pawl falls behind the first tooth. It now remains to be seen how the translating devices are to be restored to the first position. The lever or segment 81 to the right, the one nearest upright B, carries a cam 90, Figs. 6 and 7, which as the bar 80 is drawn forward in returning the indicators engages the rear end of pawl 56 and raises it out of engagement with the ratchet 54, thereby removing that check or lock. As the resetting-bar 80 approaches the limit of its motion and the last tooth of each indicator-segment passes the translating-bar the pawl 56 is drawn back until it strikes the end of a projection upon the upper tooth 57 of the pallet, (which tooth is arranged to slide longitudinally and is held projected by a spring 57×,) forcing said tooth 57 out from engagement with the toothed segment 53, (see Fig. 4,) thereby entirely releasing the shaft 52 and permitting the translating-bar to return to first position under the influence of its spring. Thus the indicators are returned to the first position and the translating devices are reset preparatory to the setting up and adding a new series of figures.

The resetting of the indicators brings all the sight-openings 9 in line, and through these openings the figures of the registers are read.

The operation of the machine as a whole may be illustrated by reference particularly to Figs. 8 and 9, the latter showing the positions of the indicators when adjusted to represent "5904" and the former showing the indicators reset and disclosing the registers. It is assumed that both the registers and indicators stand at zero, as indicated by the second, fifth, and sixth, counting from the right, they not having been affected. The first figure to be set up and registered is "4." Hence the "4" key is depressed. This moves the bar 10, controlled by said key, shifts the locking-bar 22 to release the registers, and shifts the translating-bar 40 through the medium of tooth 58 until the notch in the first dog 43 is opposite the segment 41 of the units-indicator, when the latter, through the action of arm 16 and its spring, will be carried back until arrested by the stop-bar 10 of the "4" key. The figure "4" of the indicator will then stand just above cross-bar C and the register will have been advanced a corresponding distance, the figure "4" standing immediately below the corresponding figure on the indicator. Upon the release of the "4" key the yoke 30 returns, the stop-bar 10 and the locking-bar 22 are retracted, and the translating-bar shifted by tooth 57 of the pallet, thus locking the units and all the other indicators. There being nothing to register in the tens-column the "0" key is depressed, and, acting through its bar 60, it locks the several indicators by engaging their segments and actuates the pallet to cause an advance of the translating device, the second dog passing the tens indicator and register without operating them. The third dog of the translating device, which controls the hundreds indicator and register, has its notch 44 within less than one degree of motion of the segment. Consequently upon pressing the "9" key the third or hundreds indicator will be released and carried around to the ninth stop-bar 10, as described. The same operations are gone through with when the next figure is registered, which is accomplished by pressing the "5" key and setting the register of the thousands-indicator at 5. The several figures "5904" now appear in line and in the order as written just above cross-bar C, as shown in Fig. 9, so that the correctness of the registering operation can be verified. During these operations the registers have been advanced correspondingly; but the total amount carried on the registers is not made visible until the indicators are reset, when the total is disclosed, as indicated in Fig. 8, the registers having been held stationary while the indicators were being drawn back to first position. Suppose now it is desired to add "49608" to the amount already registered—i. e., "5904." The "8" key will first be depressed, causing the units-indicator to advance until the figure "8" appears just above the cross-bar C. At the same time the units-register will be advanced eight points, or from figure "4" of one series to figure "2" of the next succeeding series. As the units-register passes beneath the pivoted dog 70 of the tens-register the tooth 61 will elevate said dog and raise the pawl 17 resting thereon until the arm 16 is disengaged from the tens-indicator, whereupon the tens-register will be advanced one point—that is, from "0" to "1"—and the reëngagement of arm 16 with the tens-indicator will follow, the forward movement of the arm having withdrawn the pawl 17 from the dog 70 and allowed it to engage the second notch or tooth of segment 18. There being nothing to add in the tens-column, the "0" key is depressed, after which the "6" key is operated. The indicator of the hundreds-column will be advanced until "6" appears above the cross-bar and the hundreds-register will be advanced six points, or from "9" in one series to "5" in the next. In passing from one series to the next the tooth 61 of the hundreds-register will elevate the pivoted dog 70 of the thousands-register and cause the latter to advance one point, or from "5" to "6." Upon pressing the "9" key to indicate the thousands in the number to be added the thousands-indicator will advance to disclose number "9" and the thousands-register will be advanced nine points, and will thus have been advanced a total of ten points, one by the action of the hundreds-register in carrying and nine by the keys. This movement will carry the thousands-register from "5" in one series to "5" in the next series, and in passing from the one to the other its tooth 61 will operate through dog 70 to advance the ten-thousands register one point, so that when the "4" key is next operated to indicate the ten thousands of the sum to be added the register will be advanced four more points. The operation having been completed, the indicators will read "49608," that being the number added, and when the indicators are reset through the agency of the resetting devices the registers will disclose a total of "55512."

Although the embodiment of the new principle herein described is believed to possess many advantages with respect to the mechanical construction and arrangement of its parts, it is obvious that radical departures in form and arrangement may be made without departing from the fundamental principles described, more especially that which involves the progressive application of the series of controlling-keys to the indicators and registers.

To set the machine at zero, it is only necessary to depress for each register not already at zero a key whose value added to the numeral shown at the register-opening will make ten. For instance, for any register showing "9" the "1" key is depressed, for any register showing "1" the "9" key, and so on till all are brought to zero.

Having thus described my invention, what I claim as new is—

1. The combination of a series of indicators, a series of registers, a series of keys and a translating mechanism actuated by any key of said series and governing the connection between the series of keys and the series of indicators and registers, whereby the keys of the series are rendered operative upon one indicator and register at a time, and their control is automatically transferred from one to another progressively, substantially as described.

2. The combination of a series of indicators, a series of registers; a series of keys, actuating devices moved by the keys to control the movements of the registers and indicators, and translating devices actuated by any key of said series for successively placing each register and its indicator under the control of all the keys, substantially as described.

3. The combination of a series of indicators; a series of keys; actuating mechanism intermediate the series of keys and each indicator for controlling its position; a translating mechanism controlled by any key of said series to establish connection between the series of keys and each indicator, progressively, and a resetting mechanism for returning the indicators and the translating mechanism to first position; substantially as described.

4. The combination of a series of registers; a series of keys; actuating mechanism intermediate each register and the series of keys; a translating mechanism actuated by any key of said series for establishing connection between the series of keys and each register, successively; and a resetting mechanism for returning the translating mechanism to first position; substantially as described.

5. The combination of a series of indicators; a series of registers; a series of keys; actuating mechanism intermediate the registers and indicators and the series of keys; a translating mechanism actuated by any key of said series for establishing connection between each indicator and its register and the series of keys; and a resetting mechanism operating upon the indicators and the translating mechanism to return them to the starting-point; substantially as described.

6. The combination of a series of registers, a series of indicators, a series of keys, actuating devices for the registers and indicators controlled by the keys; and a translating mechanism actuated by any key of said series for shifting the action of the keys from one indicator to another progressively and to lock all the indicators save the one at the time subjected to the control of the keys; substantially as described.

7. The combination of a pivoted indicator provided with a stop tooth or projection; a series of stop-bars, provided with notches for the passage of said tooth or projection on the indicator; and a series of keys each engaging one of the stop-bars to shift it into the path of the stop-tooth on the indicator and arrest the latter; substantially as described.

8. The combination of a series of movable indicators each provided with a stop tooth or shoulder; a series of stop-bars grooved to permit the passage of the stop-teeth of the indicators and arranged at different points in the traverse of the indicators; an impelling-spring for each indicator; a series of keys each engaging one of the stop-bars and operating to shift it into the path of the stop teeth or shoulders upon the indicators; and a locking bar or device engaging the several indicators and operated by the keys to release the indicators; substantially as described.

9. The combination of a series of indicators pivotally supported and each provided with a stop-tooth; a series of stop-bars arranged at regulated distances apart parallel with the axis of the indicators, said bars being movable longitudinally and provided with notches for the passage of the stop-teeth of the indicators; and a series of keys pivotally supported and each provided with a wedge or incline engaging one of the stop-bars to shift it longitudinally; substantially as described.

10. The combination of a register-wheel movable intermittingly in the same direction, and an oscillating indicator overlying the register-marks and provided with a sight-opening through which the register is read when the indicator is at zero on the starting-point; substantially as described.

11. The combination of the register; the oscillating indicator, the motor-spring; the arm provided with two pawls, one engaging the indicator and the other the register; substantially as described.

12. The combination of the flanged register; the flanged indicator encircling the register and provided with the slot and toothed segment; and the pivoted arm, its spring and spring-actuated pawls; substantially as described.

13. The combination to form a carrying mechanism of two adjacent registers; an actuating device for controlling the advance of the register of higher value; a spring-actuated impelling-arm detachably connected to the register and its actuating device; and a dog actuated by the register of lower value and operating upon the connection between said impelling-arm and the actuating device of the higher register to detach and permit an advance movement of the latter; substantially as described.

14. The combination, to form a carrying mechanism, of adjacent registers, an actuating device for controlling the advance of the register of higher value, a spring-actuated impelling device connected to and having a limited movement with reference to the actuating device and means operated by the register of lower value to actuate the connection between said impelling device and the actuating device of the higher register to disconnect and permit an advance movement of the latter; substantially as described.

15. The combination, to form a carrying mechanism, of adjacent registers, an actuating device for controlling the advance of the register of higher value, a spring-actuated impelling device detachably connected to said register and connected to and having a limited movement with reference to the actuating device, means operated by the register of lower value to actuate the connection between said impelling device and the actuating device of the higher register to disconnect and permit an advance movement of the latter, and a resetting mechanism for restoring the actuating device to its initial position; substantially as described.

16. The combination of the series of registers; a separate actuating device controlling the advance of each register; a spring-actuated arm intermediate each register and its actuating device, and detachably connected thereto; and a series of dogs engaging the connections between the registers and their actuating devices, said dogs receiving motion from teeth or projections on the registers of lower value for effecting the release and advance of the register next higher in value; substantially as described.

17. The combination of the series of indicators and the corresponding series of registers mounted to turn about the same axis; the series of spring-actuated impelling-arms carrying pawls engaging the registers and indicators; the series of pivoted dogs each overlying one register in position to engage the pawl connecting the arm of the next higher register with its indicator; and the teeth located upon the registers in proper position to engage said dogs; substantially as described.

18. The combination of a register provided with two or more series of figures upon its periphery, and with a series of perforations and a series of notches; an indicator overlying said register and provided with a series of figures, a sight-opening and a stop-tooth; an arm pivotally supported upon an axis coincident with that of the register and indicator, said arm bearing a pawl for engaging the perforations in the register and another pawl engaging a toothed segment on the indicator; an actuating-spring engaging said arm; controlling devices engaged by the stop-tooth on the indicator for determining the advance of the latter and of the register; a lock engaging the notches on the register; and a resetting device engaging the pawl which connects the arm and register, for disconnecting these parts and retracting the indicator; substantially as described.

19. The combination with a series of indicators and corresponding registers, each set comprising a rotating register and an oscillating or reciprocating indicator, a spring-actuated arm provided with a pawl engaging perforations in the register to advance the latter and a second pawl engaging teeth on the indicator to advance the latter; of a series of stop-bars controlled by a series of keys for limiting the motion of each indicator when released; a translating-bar provided with notched dogs engaging teeth on the indicators and operating to lock the latter against movement toward the stop-bars; and actuating devices controlled by the keys and operating to intermittingly advance the translating-bar, to successively release the indicators and permit them to advance one at a time to the position determined by the stop-bar of the key operated; substantially as described.

20. The combination with a series of keys of a series of oscillating indicators, and actuating devices therefor controlled by said keys, each of said indicators being provided with a toothed segment, of a translating-bar having spaced notches, said bar engaging the toothed segments on the indicators, and means for moving said bar intermittingly to successively permit the passage of the said segments; substantially as described.

21. The combination with a series of keys, a series of pivoted indicators and actuating devices therefor controlled by said keys, each of said indicators being provided with a series of teeth, of a translating-bar having spaced notches, said bar engaging the teeth of the indicators to lock the latter, and, being moved intermittingly, to permit the passage of one indicator at a time; actuating devices for the translating-bar; and connections between the series of keys and said actuating devices for effecting an advance movement of the translating-bar and the release of one of the indicators each time one of the keys is depressed or operated to designate the position of the indicator; substantially as described.

22. The combination with a series of keys, a series of pivoted indicators and actuating devices therefor controlled by a series of keys, each indicator being provided with a series of teeth; of a translating-bar provided with retractile notched dogs for engaging the teeth of the indicators; actuating devices for intermittingly advancing said translating-bar; connections between the series of keys and the said actuating devices; and a resetting mechanism for retracting the indicators and the translating-bar; substantially as described.

23. The combination with a series of keys, a series of pivoted indicators, a series of registers, and actuating devices controlled by a series of keys, each indicator being detachably connected to its register, and provided with a series of teeth; of a translating-bar engaging said teeth and provided with a series of ways or notches; actuating devices for intermittently advancing said translating-bar; connections between the series of keys and said actuating devices for operating the latter; a locking device engaging the registers and actuated by the keys to release the registers; and a resetting mechanism operating to retract the indicators and the translating-bar; substantially as described.

24. The combination with the series of indicators, their actuating devices, the series of keys, of a series of stop-bars engaging the indicators to arrest them and the translating mechanism for permitting the passage of the indicators successively, each bar being actuated by a separate key; substantially as described.

25. The combination with a series of keys, a series of movable indicators and the actuating mechanism therefor controlled by said keys; of the series of registers, a locking-bar common to all the registers; and a bar or yoke acted upon by each key and operating to shift the said locking-bar, to simultaneously release all the registers when any key is operated; substantially as described.

26. The combination with the series of keys, a series of pivoted indicators and actuating mechanism therefor controlled by a series of keys; of a series of registers; a locking-bar for said registers; a translating-bar engaging toothed segments on the indicators and operating to release the latter, one at a time, in succession; and a yoke or bar common to all the keys operating upon the translating-bar to intermittently advance the latter, and upon the locking-bar of the registers, to release the latter; substantially as described.

27. The combination with the series of keys, the series of indicators, the series of registers, carrying devices intermediate adjacent registers, and actuating mechanism controlled by said keys to set the indicators and advance the register; of the locking-bar for the registers; the translating-bar for the indicators; actuating devices for the translating-bar; transmitting devices acted upon by the keys to move the register-locking bar and the actuating devices of the translating-bar; and a resetting mechanism engaging the connections between the indicators and registers to separate them and return the indicators, said resetting mechanism also acting upon the actuating devices of the translating-bar to release the latter and return it to first position; substantially as described.

28. The combination with the series of keys, the indicators, each provided with a toothed segment; of the translating device provided with retractile dogs notched at the edge, actuating devices therefor; said translating device receiving motion from the keys which operate through the actuating devices to control the position of the registers; substantially as described.

29. The combination with a series of keys, a series of movable indicators, each provided with a series of teeth or shoulders, and actuating devices controlled by said keys; of a translating device furnished with a series of passages and engaging the indicators; said translating device being actuated by the keys; substantially as described.

30. The combination with a series of keys, a series of movable registers, and actuating devices therefor controlled by said keys for determining the advance of each register; of a translating device deriving motion from the keys and operating to successively release the registers, connections between the translating device and the keys, said translating device being provided with engaging surfaces and passages coöperating with teeth or shoulders on the actuating devices to control the movements of the registers; substantially as described.

31. The combination with the keys, the indicators, the registers and the spring-actuated impelling-arms each provided with pawls engaging an indicator and a register; of the series of dogs mounted upon the frame in position to engage the pawls connecting the impelling-arms and the indicators; the lifting-teeth on the register engaging said dogs; the stop-bars controlled by the keys and operating to arrest the indicators and registers; the locking-bar engaging the registers; and the resetting device provided with inclines engaging the pawls connecting the impelling-arms and registers; substantially as described.

32. The combination with the series of keys, the series of indicators, the actuating devices controlled by the keys and operating to determine the position of each indicator, and the translating-bar engaging the indicators and operating to bring them successively within control of the series of keys; of the actuating mechanism for advancing the translating-bar, the same comprising a toothed segment, gearing connecting said segment with said bar, and a vibrating pallet engaging the teeth of the said segment, connections between the pallet and said keys; substantially as described.

33. The combination with the translating-bar, of the shaft carrying the ratchet and toothed segment, gearing intermediate the same, the pivoted pallet acting upon said toothed segment, and the holding-pawl engaging the ratchet; substantially as described.

34. The combination with the indicator or register actuating mechanism, the series of keys, and the translating-bar; of the toothed segment geared to said bar; the ratchet; the pawl engaging said ratchet; the pivoted yoke engaged by the keys; the pallet mounted on said yoke and having a retractile tooth; a resetting device, and the cam carried by the resetting device engaging the pawl to withdraw it from the ratchet and engage the retractile tooth of the pallet, whereby when the resetting device is operated the translating-bar is released and returned to first position by its spring; substantially as described.

35. The combination with the series of keys, the indicators having toothed segments, the registers, and the actuating devices therefor controlled by said keys; of the translating-bar with retractile dogs notched for the passage of the toothed segments of the indicators; the toothed segment and ratchet, gearing connecting the same with said translating-bar; the locking-bar engaging the registers; the pivoted yoke engaged by the keys and operating through an arm upon said locking-bar; the pallet having a retractile tooth and mounted upon said yoke; the pawl engaging the said ratchet; the resetting device engaging the indicators and provided with a cam operating upon the pawl to withdraw the latter from the ratchet and operate upon the retractile tooth of the pallet, to release the translating-bar; substantially as described.

36. The combination of the translating-bar, the series of indicators, each provided with teeth or projections coöperating with said translating-bar for determining the order in which said indicators shall be operated; a series of nine keys operating through suitable actuating devices to control the position of each indicator and the movement of the translating-bar; and a separate key operating through a movable bar to engage and lock the several indicators while effecting an advance movement of the translating-bar; substantially as described.

37. The combination with the series of indicators mounted to turn upon a supporting-shaft; of the impelling-arm pivoted upon said shaft and each detachably connected to its indicator, an impelling-spring for each arm attached to a collar splined to the shaft; and devices applied to the shaft for holding the same and adjusting the tension of the springs.

38. The combination of a series of movable indicators, a series of stops for arresting the motion of the indicators, and a series of keys each operating a stop to arrest the motion of an indicator.

39. The combination of a series of movable indicators, power devices for moving the indicators when released, a series of keys and a series of stops controlled by the keys for arresting the motion of the indicators; substantially as described.

40. The combination of a series of movable indicators each provided with a motor-spring, a series of keys and a series of stops for arresting the motion of the indicators when released; substantially as described.

41. The combination of a series of indicators, motors for moving the indicators, a series of keys, translating mechanism controlled by the keys and operating automatically to shift the controlling action of the keys from one indicator to another progressively, and a series of stops controlled by the keys for determining the position of each indicator when arrested.

42. The combination of a series of registers, actuating devices therefor, a series of keys for releasing the actuating devices, a motor for operating each actuating device when the latter is released by the key, a series of stops for determining the movement of the actuating devices when released and translating mechanism controlled by the keys operating to shift the action of the keys from one actuating device to another progressively; substantially as described.

43. The combination of a series of registers, a series of indicators, actuating devices therefor, a series of keys for releasing the actuating devices, a motor for operating each actuating device when the latter is released by the key, a series of stops for determining the movement of the actuating devices when released and translating mechanism controlled by the keys operating to shift the action of the keys from one actuating device to another progressively; substantially as described.

44. The combination of a series of indicators, power devices for moving the indicators when released, a series of keys, devices intermediate the keys and indicators controlling the positions of the indicators, and translating devices controlled by the keys operating automatically to successively release the indicators; substantially as described.

45. The combination of a series of indicators, a series of keys and intermediate devices for releasing the indicators and means controlled by the keys for arresting the indicators; substantially as described.

46. The combination of a series of registers, power devices for moving them when released, a series of keys and intermediate devices for releasing the registers and means controlled by the keys for arresting the motion of the registers; substantially as described.

47. The combination of a series of indicators, a series of registers, power devices for moving the indicators and registers when released, a series of keys and intermediate devices for releasing the indicators and registers and stop controlled by the keys for arresting the motion of the indicators and registers; substantially as described.

48. The combination of an actuator, an indicator, a series of keys, means actuated by the keys for controlling the motion of the indicator, a register, means for independently connecting the indicator and register to the actuator, and means for disconnecting the actuator from the register and resetting the indicator; substantially as described.

49. The combination of an actuator, an indicator, a series of keys, means actuated by the keys for controlling the motion of the indicator, a register, means for independently connecting the indicator and register to the actuator, and means for disconnecting the actuator from the indicator so as to permit of an independent advance of the register; substantially as described.

50. The combination with a series of movable actuators, a series of registers each connected with and operated by one of said actuators, means for releasing said actuators, means for arresting said actuators at different points of their travel and resetting mechanism for resetting said actuators to their initial positions and for automatically disconnecting the registers from the actuators; substantially as described.

51. The combination with a series of movable actuators, a series of registers each connected with and operated by one of said actuators, means for releasing said actuators, means for arresting said actuators at different points of their travel mechanism for resetting said actuators to their initial positions and for automatically disconnecting the registers from the actuators and locking means for holding the registers while disconnected from the actuators; substantially as described.

52. The combination of a pivoted indicator provided with a stop-tooth or projection, a series of stop-bars provided with notches for the passage of said tooth or projection on the indicator and a series of keys, each engaging one of the stop-bars to shift it into the path of the stop-tooth on the indicator and arrest the latter.

53. In a calculating-machine, the combination with a registering-wheel and a key-lever whereby said registering-wheel is actuated, of a stop-bar adapted to arrest the movement of said registering-wheel and mechanism whereby said stop-bar is actuated by said key-lever.

54. In a calculating-machine, the combination with ten figure-keys, of a series of registering devices, a movable carriage by means of which the registering devices are brought successively under the control of the figure-keys and mechanism actuated by the figure-keys for imparting to the carriage a step-by-step motion.

TOLBERT LANSTON.

Witnesses:
JOSEPH B. CHURCH,
ALEX. J. STEUART.